(12) United States Patent
Arik et al.

(10) Patent No.: US 10,698,518 B2
(45) Date of Patent: Jun. 30, 2020

(54) REDUCTION OF TOUCHSCREEN BOUNCE

(71) Applicant: Intel Corporation, Santa Clara, CA (US)

(72) Inventors: Kenan Huseyin Arik, Hillsboro, OR (US); Mark E. Sprenger, Tigard, OH (US); Aleksander Magi, Aloha, OR (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/778,755

(22) PCT Filed: Dec. 22, 2015

(86) PCT No.: PCT/US2015/067232
§ 371 (c)(1),
(2) Date: May 24, 2018

(87) PCT Pub. No.: WO2017/111928
PCT Pub. Date: Jun. 29, 2017

(65) Prior Publication Data
US 2018/0348941 A1 Dec. 6, 2018

(51) Int. Cl.
*G06F 3/041* (2006.01)
*G06F 1/16* (2006.01)
(52) U.S. Cl.
CPC .......... *G06F 3/0414* (2013.01); *G06F 1/1616* (2013.01); *G06F 1/1626* (2013.01);
(Continued)

(58) Field of Classification Search
CPC ...... F16F 15/002; F16F 7/1005; F16F 15/005; F16F 15/02; F16F 15/007; F16F 7/1011; G06F 3/016; G06F 3/04886; G06F 1/1616; G06F 1/1681; G06F 1/1679; G06F 1/1601
See application file for complete search history.

(56) References Cited

U.S. PATENT DOCUMENTS 7,320,455 B2 * 1/2008 Ryaboy .................. F16F 7/1011
248/638
7,616,192 B2 * 11/2009 Schroeder ............. G06F 3/0421
345/168
(Continued)

FOREIGN PATENT DOCUMENTS

WO 2017111928 6/2017

OTHER PUBLICATIONS

International Search Report and Written Opinion issued in PCT Application No. PCT/US2015/067232 dated Aug. 24, 2016; 12 pages.

*Primary Examiner* — Michael J Jansen, II
(74) *Attorney, Agent, or Firm* — Patent Capital Group

(57) ABSTRACT

Particular embodiments described herein provide for an electronic device, that includes a display and a bounce reduction mechanism configured to provide an active counterforce to a force on the display. In an example, a proximity sensor can detect when a device is going to create the force on the display. In another example, a screen bounce detection engine to detect oscillations of the display and the bounce reduction mechanism is configured to provide an active counterforce to dampen oscillation of the display.

14 Claims, 10 Drawing Sheets

(52) U.S. Cl.
CPC .......... *G06F 1/1677* (2013.01); *G06F 1/1679* (2013.01); *G06F 1/1681* (2013.01); *G06F 3/0418* (2013.01)

(56) References Cited

U.S. PATENT DOCUMENTS

| | | | | |
|---|---|---|---|---|
| 8,269,732 B2* | 9/2012 | Kwon | ...................... | G06F 3/041 345/173 |
| 8,269,738 B2* | 9/2012 | Schroeder | ............. | G06F 3/0421 345/156 |
| 8,270,148 B2* | 9/2012 | Griffith | ............... | G06F 3/03547 345/169 |
| 8,884,888 B2* | 11/2014 | Chin | ........................ | A63F 13/10 345/173 |
| 8,928,204 B2* | 1/2015 | Yun | ...................... | H03H 9/1007 310/323.01 |
| 9,102,057 B2* | 8/2015 | Fudaba | .................... | B25J 13/00 |
| 9,114,531 B2* | 8/2015 | Fudaba | .................... | G06F 3/041 |
| 9,612,626 B2* | 4/2017 | Onda | .................... | G06F 1/1679 |
| 10,007,400 B2* | 6/2018 | Kocienda | ............ | G06F 3/04883 |
| 10,107,355 B2* | 10/2018 | Arisaka | .................... | F16F 15/02 |
| 2005/0109914 A1* | 5/2005 | Ryaboy | .................. | F16F 7/1011 248/637 |
| 2007/0024593 A1* | 2/2007 | Schroeder | ............... | G06F 3/016 345/173 |
| 2008/0051942 A1 | 2/2008 | Smith et al. | | |
| 2010/0039403 A1* | 2/2010 | Schroeder | ............... | G06F 3/016 345/173 |
| 2011/0051334 A1* | 3/2011 | Griffith | ............... | G06F 3/03547 361/679.01 |
| 2012/0050176 A1* | 3/2012 | Chin | ....................... | G06F 3/038 345/173 |
| 2012/0249474 A1 | 10/2012 | Pratt et al. | | |
| 2013/0300255 A1* | 11/2013 | Yun | ....................... | H03H 9/1007 310/323.01 |
| 2014/0098474 A1* | 4/2014 | Bhowmik | ............. | G06F 1/1616 361/679.01 |
| 2014/0336820 A1* | 11/2014 | Fudaba | .................... | G06F 3/041 700/261 |
| 2014/0343729 A1* | 11/2014 | Fudaba | .................... | B25J 13/00 700/261 |
| 2015/0000083 A1* | 1/2015 | Gwin | .................... | G06F 1/1681 16/321 |
| 2015/0036273 A1 | 2/2015 | Hui et al. | | |
| 2015/0036289 A1 | 2/2015 | Aurongzeb et al. | | |
| 2015/0138713 A1* | 5/2015 | Onda | .................... | G06F 1/1679 361/679.27 |
| 2016/0139747 A1* | 5/2016 | Kocienda | ............ | G06F 3/04883 715/767 |
| 2017/0044810 A1* | 2/2017 | McBroom | ............... | F16D 55/02 |
| 2017/0045109 A1* | 2/2017 | Arisaka | .................... | F16F 15/02 |

* cited by examiner

REDUCTION OF TOUCHSCREEN BOUNCE

TECHNICAL FIELD

Embodiments described herein generally relate to the field of electronic devices and, more particularly, to an electronic device with a system and method for the reduction of touchscreen bounce.

BACKGROUND

End users have more electronic device choices than ever before. A number of prominent technological trends are currently afoot (e.g., more computing devices, more detachable displays, etc.), and these trends are changing the electronic device landscape. One of the technological trends is a touchscreen. However, one issue with touchscreens is that they typically have some sort of movement or bounce after they are touched or interacted with by a user.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

An electronic device is provided in one example embodiment and includes a display and a bounce reduction mechanism configured to provide an active counterforce to a force on the display. In some examples, a proximity sensor can detect when a device is going to create the force on the display. The active counterforce is provided if the force is greater than a threshold force. In some implementations, a screen bounce detection engine can detect oscillations of the display and the bounce reduction mechanism is configured to provide an active counterforce to dampen oscillation of the display. In some instances, the bounce reduction mechanism is configured as a hinge.

Example Embodiments

The following detailed description sets forth example embodiments of apparatuses, methods, and systems relating to detachable display configurations for an electronic device. Features such as structure(s), function(s), and/or characteristic(s), for example, are described with reference to one embodiment as a matter of convenience; various embodiments may be implemented with any suitable one or more of the described features.

Figure 1:
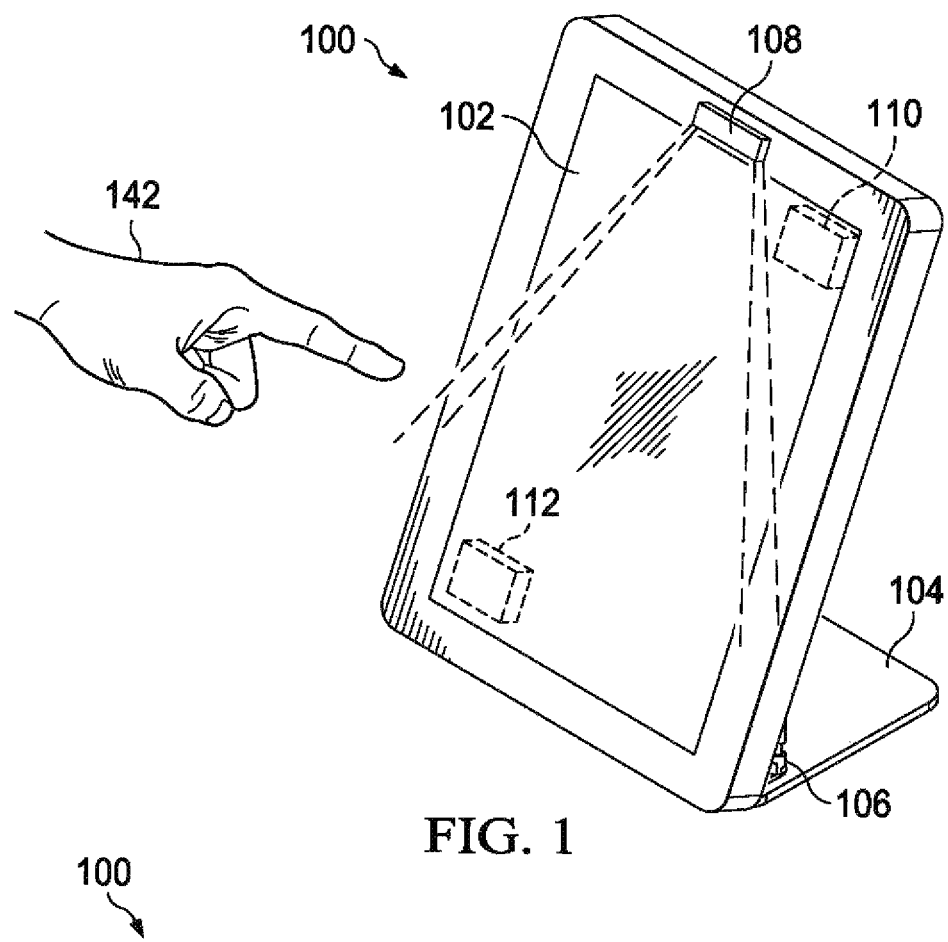
FIG. 1 is a simplified schematic diagram illustrating an embodiment of an electronic device, in accordance with one embodiment of the present disclosure.

FIG. 1 is a simplified schematic diagram illustrating an embodiment of an electronic device 100, in accordance with one embodiment of the present disclosure. Electronic device 100 can include a display 102, a display support 104, a bounce reduction mechanism 106, a screen proximity sensor 108, a screen bounce detection engine 110, and a bounce reduction engine 112. In one or more embodiments, electronic device 100 is a tablet computer. In still other embodiments, electronic device 10 may be any suitable electronic device having a display such as a mobile device, a tablet device (e.g., i-Pad™), Phablet™, a personal digital assistant (PDA), a smartphone, an audio system, a movie player of any type, etc. In an example, bounce reduction engine 106 can function as a hinge to rotatably couple display 102 and display support 104.

In one or more embodiments, display 102 can be a touchscreen display that can detect the presence and location of a touch within a display area. For example, display 102 can detect when a user's hand (or some other input devices such as a stylus) reacts with display 102. Electronic device 100 can include a battery and various electronics (e.g., processor, memory, etc.) to allow electronic device 100 to operate as a standalone tablet. Electronic device 100 may also include a wireless module, (e.g., Wi-Fi module, Bluetooth module, etc.) a camera, a microphone, and speakers.

For purposes of illustrating certain example features of communication system 100, the following foundational information may be viewed as a basis from which the present disclosure may be properly explained.

A current technological trend is a touchscreen. Unfortunately, screen bounce is a common user pain point on touch devices such as clamshells, detachable 2-in-1's, and docked tablets. This pain point has also become an ongoing issue with recent tablet design implementations for wireless charging using pedestal style kickstands. When screen bounce occurs, it causes the user to lose focus on the display content and slows down and reduces precision of sequential user touch events. Most current known solutions rely on passive damping from the material which is not effective at quickly returning the display to equilibrium. Also, as chassis reduce in thickness, it can be increasingly difficult to provide enough structure for passive damping to react and dampen touch screen bounce from user touch input. What is needed is a system and method that reduces screen bounce and hinge slip by sensing incoming user touch dynamics and proactively engaging a reaction force from an active control mechanism to reduce the displacement of the touchscreen after a touch event.

An electronic device as outlined herein can resolve these issues (and others). Particular embodiments described herein provide for an electronic device that is configured to include bounce reduction engine 112. Bounce reduction engine 112 can be configured to utilizes input from a sensor array such as 3D cameras, proximity detection, and accelerometers (e.g., screen proximity sensor 108, screen bound detection engine 110, etc.) in conjunction with an active control drive to reduce bounce settling time and minimize peak displacement after a touch event.

Bounce reduction engine 112 can be configured to allow for adjustment and be active, strongly active, turned off, etc. depending on the power state of electronic device 100 and/or user preference. Bounce reduction engine 112 can also use sensor data already existing in current electronic devices to calculate phase and amplitude of anti-bounce force input. In addition, the system and method can scale with system torque requirements from small form factors to large all-in ones.

In a specific example, when a user (e.g., with user's hand 142, stylus, etc.) is interacting with a touch screen (e.g., display 102), there is an opportunity to capture input device motion before and up to a touch event for the purpose of proactively mitigating screen bounce and displacement issues and as part of an active control system. For example, screen proximity sensor 108 can be configured to input device motion towards display 102. As the input device approaches display 102 to interact with display 102, proximity sensor 108 can detect the incoming speed and predict impact time and magnitude based on acquired data and control logic which can be used in conjunction with passive control from acquired accelerometer data to mitigate screen bounce. In an example, predicted impact dynamics can be used to engage a proactive response of an active control system (e.g., bounce reduction engine 112) to reduce screen displacement and quickly dampen oscillations.

Figure 2:
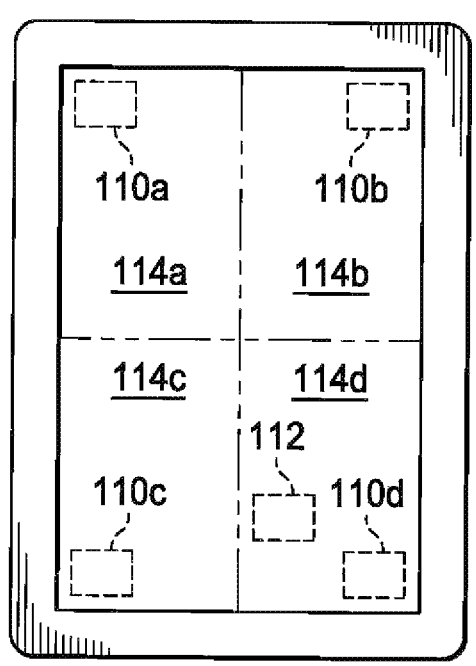
FIG. 2 is a simplified schematic diagram illustrating an embodiment of a portion of an electronic device, in accordance with one embodiment of the present disclosure.

Turning to FIG. 2, FIG. 2 is a simplified block diagram of a portion of electronic device 100 in accordance with one embodiment of the present disclosure. As illustrated in FIG. 2, electronic device 100 can include four display regions 100*1*-110*d*. Each region of display 102 can include a screen bounce detection engine designed for the region. For example, display region 114*a* may be located in an upper left area of display device and can include screen bounce detection engine 110*a*, display region 114*b* may be located in an upper right area of display device and can include screen bounce detection engine 110*b*, display region 114*c* may be located in an lower left area of display device and can include screen bounce detection engine 110*c*, and display region 114*d* may be located in an lower right area of display device and can include screen bounce detection engine 110*d*. A screen bounce detection engine may be located in each region because the screen bounce in display region 114*a* can be very different from the screen bounce in display region 114*d*. By including a screen bounce detection engine in each region, an accurate assessment of screen bounce in each region can be determined.

Figure 3:
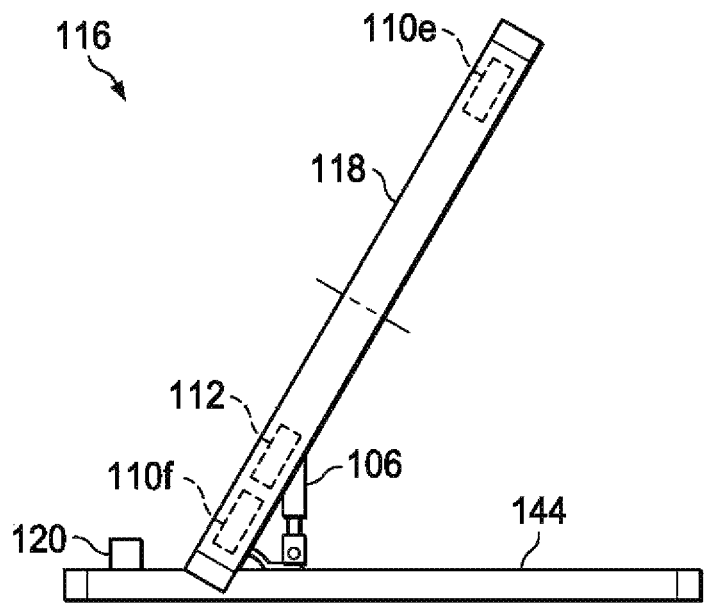
FIG. 3 is a simplified schematic diagram illustrating an embodiment of an electronic device, in accordance with one embodiment of the present disclosure.

Turning to FIG. 3, FIG. 3 is a simplified block diagram of a docking station 116 in accordance with one embodiment of the present disclosure. Docking station 116 can include bounce reduction mechanism 106, one or more bounce detection engines 110*e* and 110*f*, bounce reduction engine 112, a device support 118, interconnect 120, and base 144. Interconnect 120 can be configured to couple an electronic device (e.g., electronic device 100) to docking station 116 can help facilitate communications between the electronic device and docking station 116. Each bounce detection engine 110*e* and 110*f* can be configured to detect bounce or oscillations of device support 118. For example, when a user interacts with a touchscreen associated with an electronic device coupled to docking station 116, the interaction may cause the display and device support 118 to bounce. Also, when an electronic device is first coupled to docking station 116, device support 118 and the display on the electronic device may experience bounce or oscillations.

In an example, docking station 116 can be configured to allow for wireless charging. With the planned growth of wireless charge integration, a pedestal kickstand can provide flexibility to adjust screen angle while wirelessly charging. However, this is more susceptible to screen bounce and\or hinge slip due to the long span between the hinge axis and top of the touch screen. Bounce reduction engine 112 can be configured to ensure a controlled system bounce response even for thin tablets with pedestal kickstands.

Figure 4:
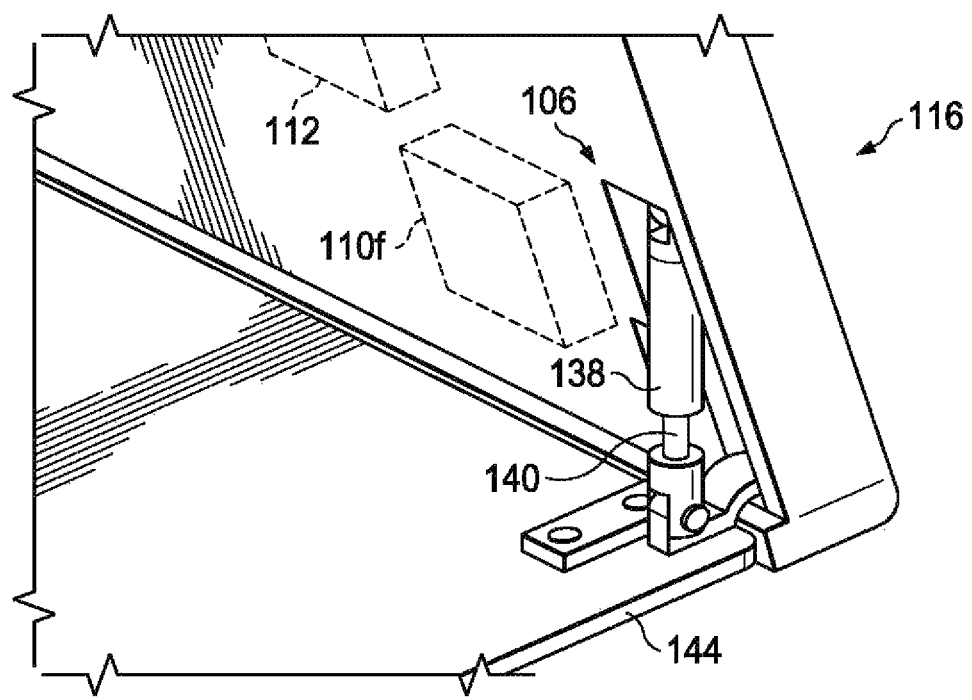
FIG. 4 is a simplified schematic diagram illustrating an embodiment of an electronic device, in accordance with one embodiment of the present disclosure.

Turning to FIG. 4, FIG. 4 is a simplified block diagram of a portion of docking station 116 in accordance with one embodiment of the present disclosure. In an example, bounce reduction mechanism 106 can include a linear actuator 138 and a piston 140. In an example, bounce reduction mechanism 106 can be part of a pedestal kickstand style. Bounce reduction mechanism 106 can provide active resistance by using variable friction to absorb a desired amount of friction and reduce bouncing or oscillations of a touchscreen. Bounce reduction mechanism 106 can be configured to not provide too much resistance and create a bounce back or amply the bouncing of the touch screen.

Figure 5:
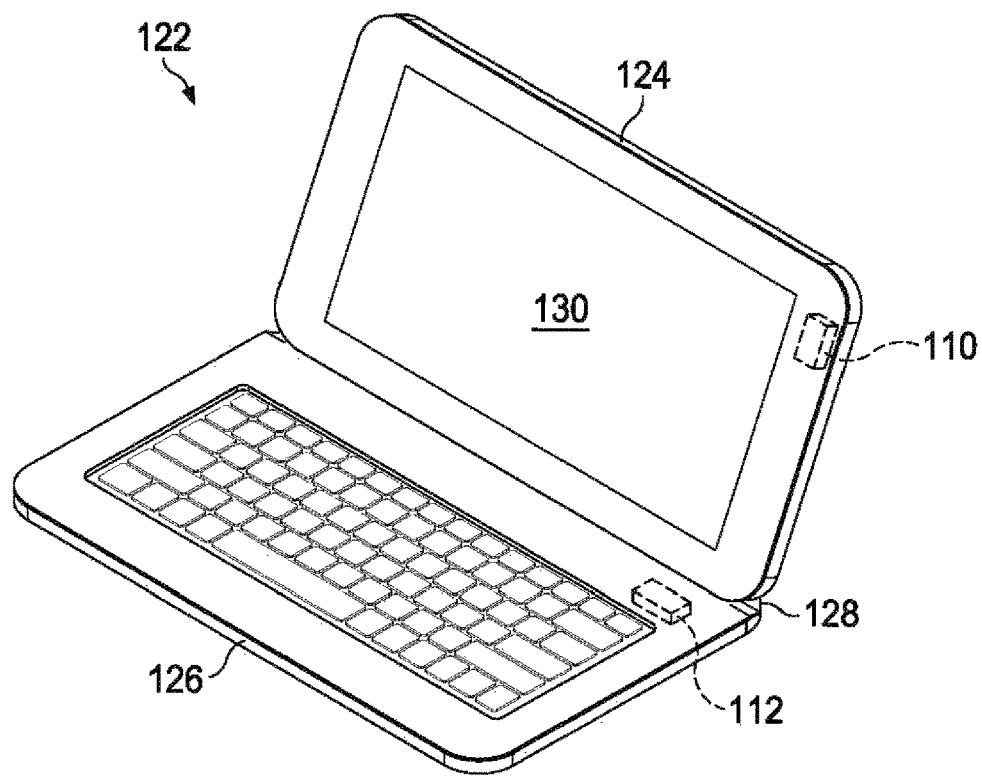
FIG. 5 is a simplified schematic diagram illustrating a portion of an embodiment of an electronic device, in accordance with one embodiment of the present disclosure.

Turning to FIG. 5, FIG. 5 is a simplified block diagram of a clamshell electronic device 122 in accordance with one embodiment of the present disclosure. Clamshell electronic device 122 can include a first housing 124 and a second housing 126. First housing 124 can include a bounce detection engine 110 and touchscreen display 130. Second housing 126 can include bounce reduction engine 112. In an example, bounce reduction engine 112 can be located in first housing 124. First housing 124 can be coupled to second housing 126 using hinge 128. Hinge 128 can be configured with active elements to reduce bounce or oscillations of first housing 124.

In an example, hinge 128 can include a continuous hinge design. For example, hinge 128 can include a continuous membrane of artificial muscle that attaches first housing 124 to second housing 126 and provides a sleek monolithic look.

The continuous membrane can include EAP cells and may be controlled electrostatically by bounce reduction engine 112. In an example, a simple voltage controller can control the voltage to the membrane causing it to expand and contract to provide the needed motion. When the voltage is increased the membrane contracts in one direction and expands in the other. By applying membrane segments independent of another it is possible to have expansion and contracting membranes coupled together which cause the bending of polymer film.

In an embodiment, first housing 124 can be rotated away from second housing 126, (e.g., opened and closed) using voice command or touch or activation of a button. The open close position can be set to a predetermined position or adjusted infinitely automatically. Once open, the position or angle of first housing 124 can be adjusted by hand. The EAP has the ability to sense load by sensing change in capacitance. As a load is applied, the capacitance of the EAP cell changes. Based on load and duration, it can be relatively easy to detect the load is intentional and to allow the position of the display to adjust and then maintain position.

In another embodiment, inputs to touchscreen 130 can cause a "bounce" in first housing 124 that will change the capacitance. As this change in capacitance is detected it is translated into movement of touchscreen 130. Bounce reduction engine 112 can be configured to respond with input to dampen the motion and quickly reduce the display bounce and return the display to a nominal position.

Figure 6:
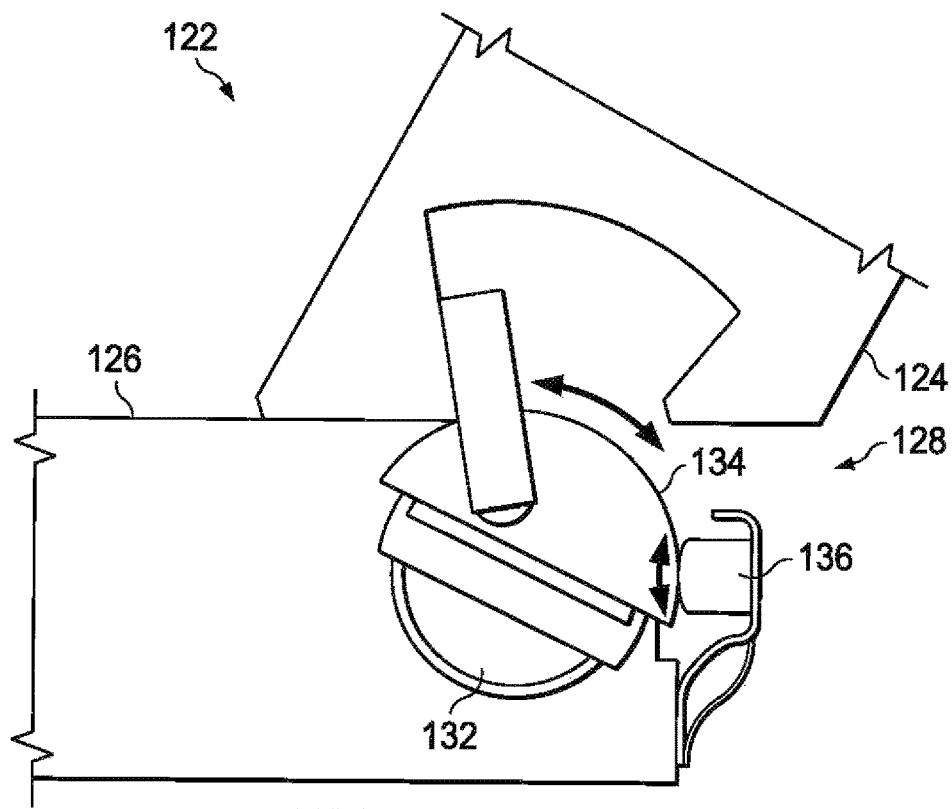
FIG. 6 is a simplified block diagram illustrating a portion of an embodiment of an electronic device, in accordance with one embodiment of the present disclosure.

Turning to FIG. 6, FIG. 6 is a simplified block diagram of a portion of clamshell electronic device 122 in accordance with one embodiment of the present disclosure. In an example, hinge 128 can include a rotation drive configured as an active control drive to reduce bounce or oscillations of first housing 124. In an example, a piezo motor 136 can vibrate using a wave signal to generate torque on a hinge shaft 134 through a friction surface. The increase in torque affects the rotation of hinge shaft 134 on rotation member 132 and can dampen oscillations or bouncing of first housing 124.

Figure 7:
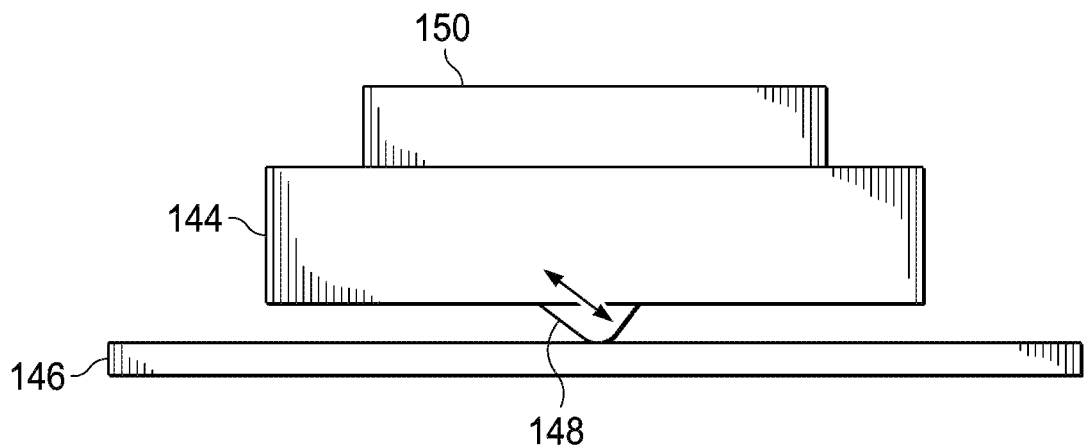
FIG. 7 is a simplified block diagram illustrating a portion of an embodiment of an electronic device, in accordance with one embodiment of the present disclosure.

Turning to FIG. 7, FIG. 7 is a simplified block diagram of a portion of a hinge in accordance with one embodiment of the present disclosure. In an example, the hinge can include an oscillating piezoceramic actuator 150, a coupling element 144, and a runner 146. In an example, a bounce reduction engine can activate oscillating piezoceramic actuator 150 which would activate oscillating arm 148 and allowing 146 to walk or move in a desired direction and dampen the bounce or oscillations of a touchscreen. While various methods and means are illustrated for dampening the bounce or oscillations of a touchscreen, other methods and means may be used such as compact solenoids or artificial muscles and all are within the scope of this application.

Figure 8:
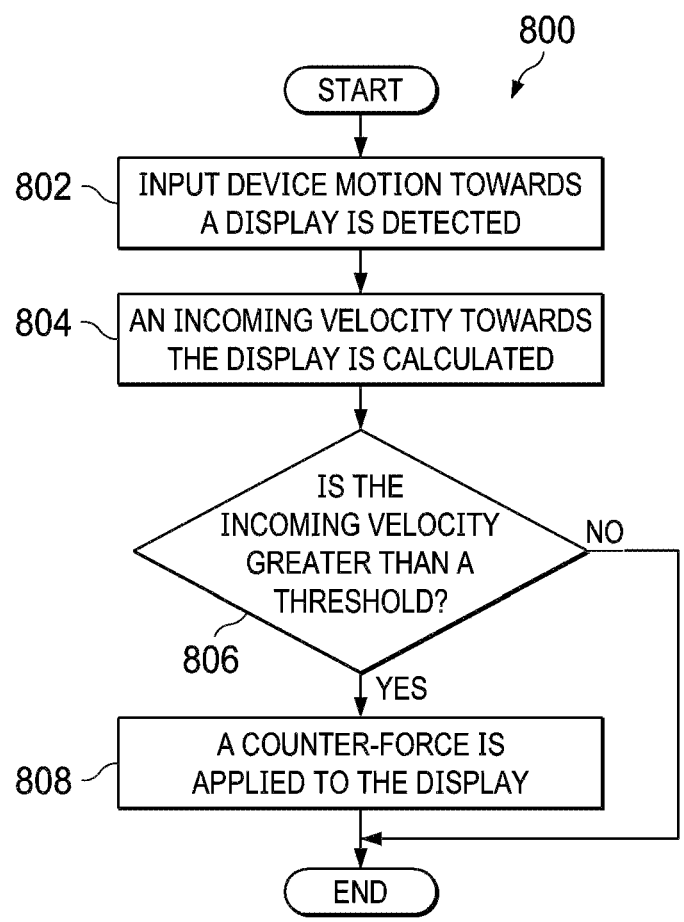
FIG. 8 is a simplified a simplified flow diagram illustrating potential operations associated with one embodiment of the present disclosure.

Turning to FIG. 8, FIG. 8 is an example flowchart illustrating possible operations of a flow 800 that may be associated with the reduction of touchscreen bounce, in accordance with an embodiment. In an embodiment, one or more operations of flow 800 may be performed by bounce detection engine 110 and bounce reduction engine 112. At 802, input device motion towards a display is detect. For example, screen proximity sensor 108 may detect the motion of user's hand 142 as it approaches display 102. At 804, an incoming velocity towards the display is calculated. At 806, the system determines if the incoming velocity is greater than a threshold. If the incoming velocity is greater than a threshold, a counter force is applied to the display, as in 808. For example, bounce reduction engine 112 may determine that the incoming velocity of user's hand 142 is greater than a threshold and therefore cause bounce reduction mechanism 106 to apply a counter force.

Figure 9:
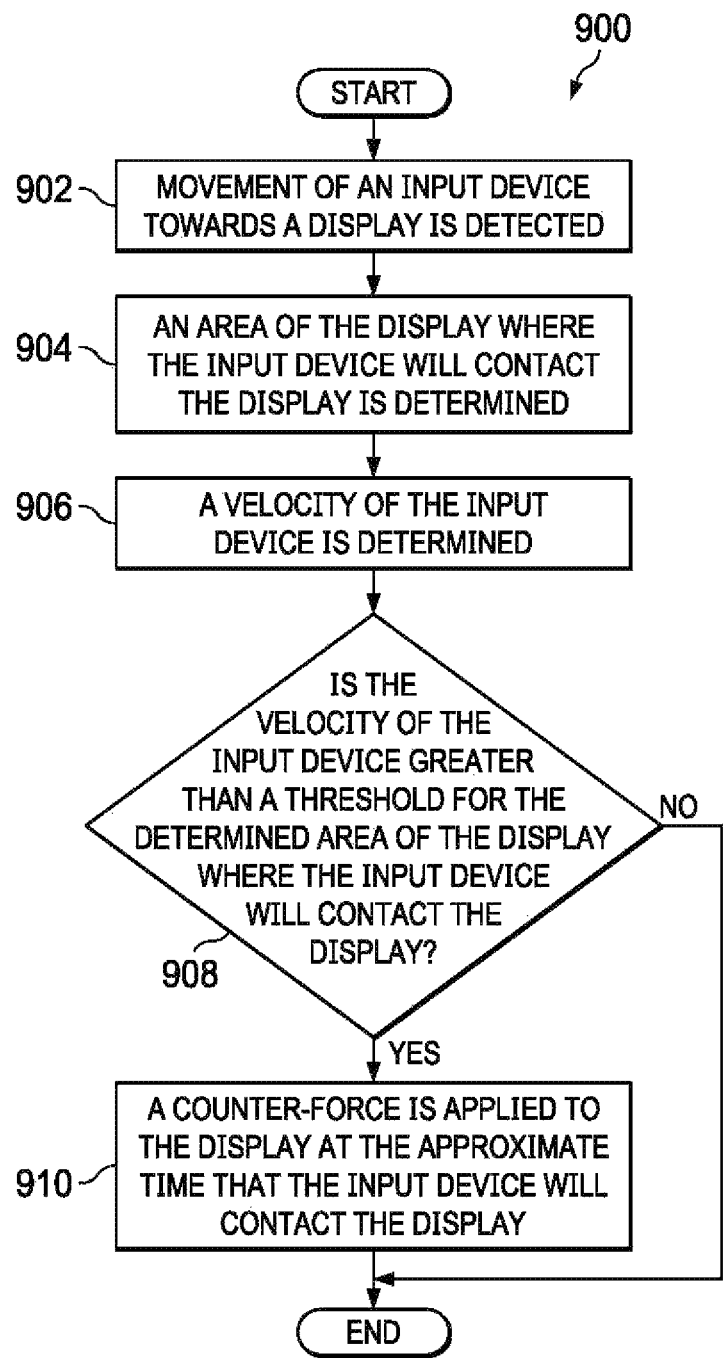
FIG. 9 is a simplified a simplified flow diagram illustrating potential operations associated with one embodiment of the present disclosure.

Turning to FIG. 9, FIG. 9 is an example flowchart illustrating possible operations of a flow 900 that may be associated with the reduction of touchscreen bounce, in accordance with an embodiment. In an embodiment, one or more operations of flow 900 may be performed by bounce detection engine 110 and bounce reduction engine 112. At 902, movement of an input device towards a display is detected. For example, screen proximity sensor 108 may detect the motion of user's hand 142 as it approaches display 102. At 904, an area of the display where the input device will contact the display is determined. For example, it may be determined if the input device will contact display region 114a, 114b, 114c, or 114d. At 906, a velocity of the input device is determined. At 908, the system determines if the velocity of the input device is greater than a threshold for the determined area of the display where the input device will contact the display. If the the velocity of the input device is greater than a threshold for the determined area of the display where the input device will contact the display, then a counter-force is applied to the display at the approximate time that the input device will contact the display. In an illustrative example, if user's hand 142 contacted display region 114d with a specific amount of force, display 102 may not bounce or oscillate past a threshold. However, if if user's hand 142 contacted display region 114a with the same specific amount of force, display 102 may oscillate past a threshold and a counter force may need to be applied.

Figure 10:
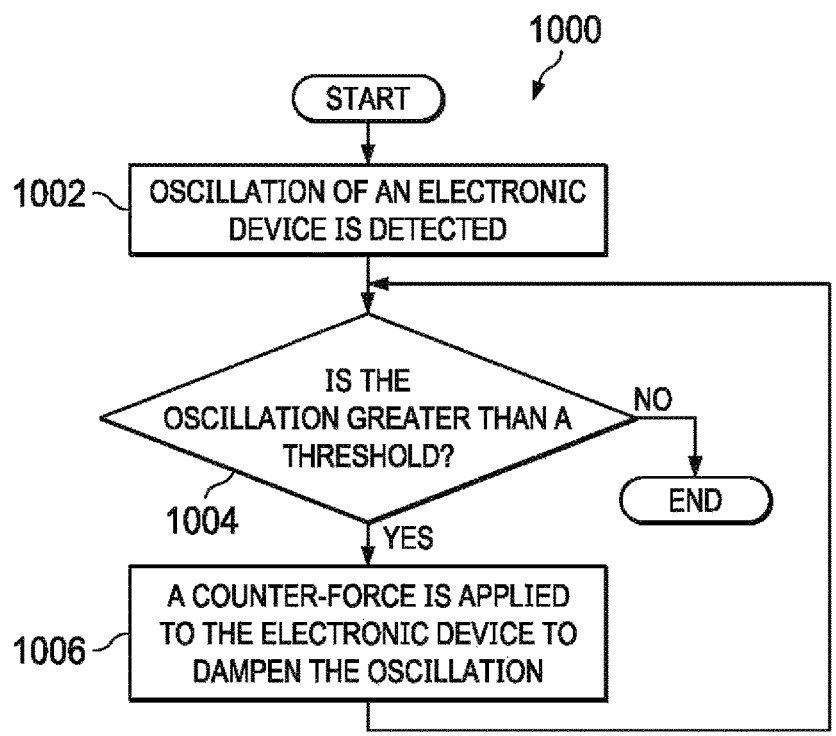
FIG. 10 is a simplified a simplified flow diagram illustrating potential operations associated with one embodiment of the present disclosure.

Turning to FIG. 10, FIG. 10 is an example flowchart illustrating possible operations of a flow 1000 that may be associated with the reduction of touchscreen bounce, in accordance with an embodiment. In an embodiment, one or more operations of flow 1000 may be performed by bounce detection engine 110 and bounce reduction engine 112. At 1002, oscillation of an electronic device is detected. At 1004, the system determines if the oscillation is greater than a threshold. If the oscillations is greater than a threshold, then a counter force is applied to the electronic device to dampen the oscillation, as in 1006. For example, some type of active element such as bounce reduction mechanism 106, hinge shaft 134, or some other active element that can be activated to produce the counter force may be applied. Then, at 1004, the system again determines if the oscillation is greater than a threshold. If the oscillation is not greater than a threshold, the the process ends and a counter force is not applied.

Figure 11:
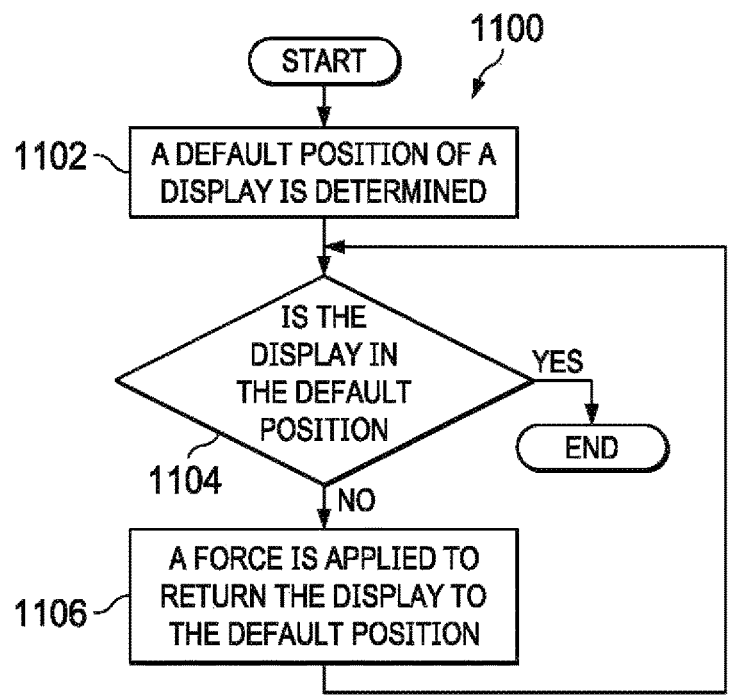
FIG. 11 is a simplified a simplified flow diagram illustrating potential operations associated with one embodiment of the present disclosure.

Turning to FIG. 11, FIG. 11 is an example flowchart illustrating possible operations of a flow 1100 that may be associated with the reduction of touchscreen bounce, in accordance with an embodiment. In an embodiment, one or more operations of flow 1100 may be performed by bounce detection engine 110 and bounce reduction engine 112. At 1102, a default position of a display is determined. At 1104, the system determines if the display is in the default position. If the system is not in the default position, then a force is applied to return the display to the default position, as in 1106. For example, some type of active element such as bounce reduction mechanism 106, hinge shaft 134, or some other active element that can be activated to produce the counter force may be applied. Then, the system returns to 1104 and determines if the display is in the default position. In an illustrative example, if a user is continuously pushing on the display, the system may determine that a counter force needs to be applied.

Figure 12:
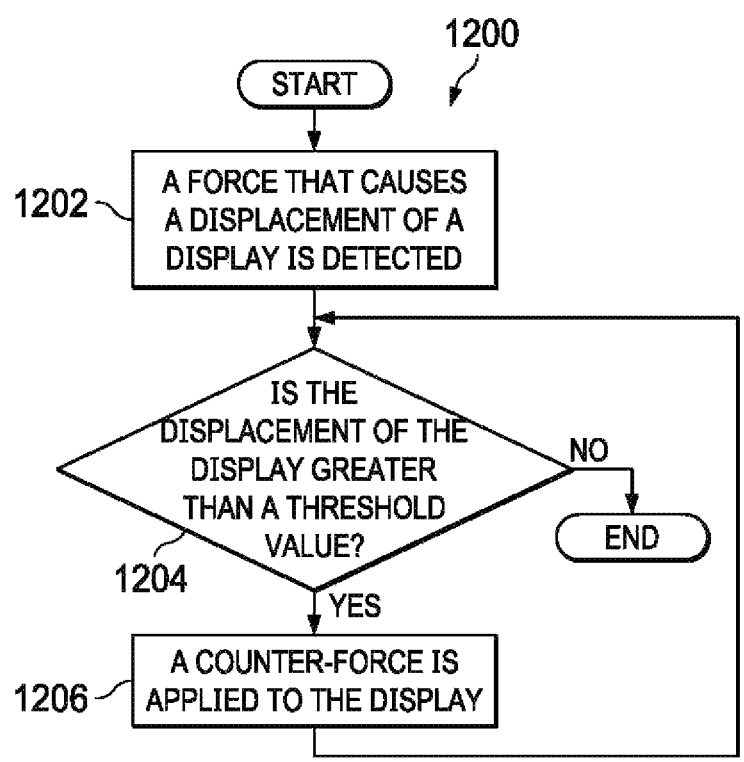
FIG. 12 is a simplified a simplified flow diagram illustrating potential operations associated with one embodiment of the present disclosure.

Turning to FIG. 12, FIG. 12 is an example flowchart illustrating possible operations of a flow 1200 that may be associated with the reduction of touchscreen bounce, in accordance with an embodiment. In an embodiment, one or more operations of flow 1200 may be performed by bounce detection engine 110 and bounce reduction engine 112. At 1202, a force that causes a displacement of a display is detected. At 1204, the system determines if the displacement of the display is greater than a threshold value. If the displacement is greater than a threshold value, then a counter force is applied to the display, as in 1206 and the system again determines if the displacement of the display is greater than a threshold value, as in 1204.

Figure 13:
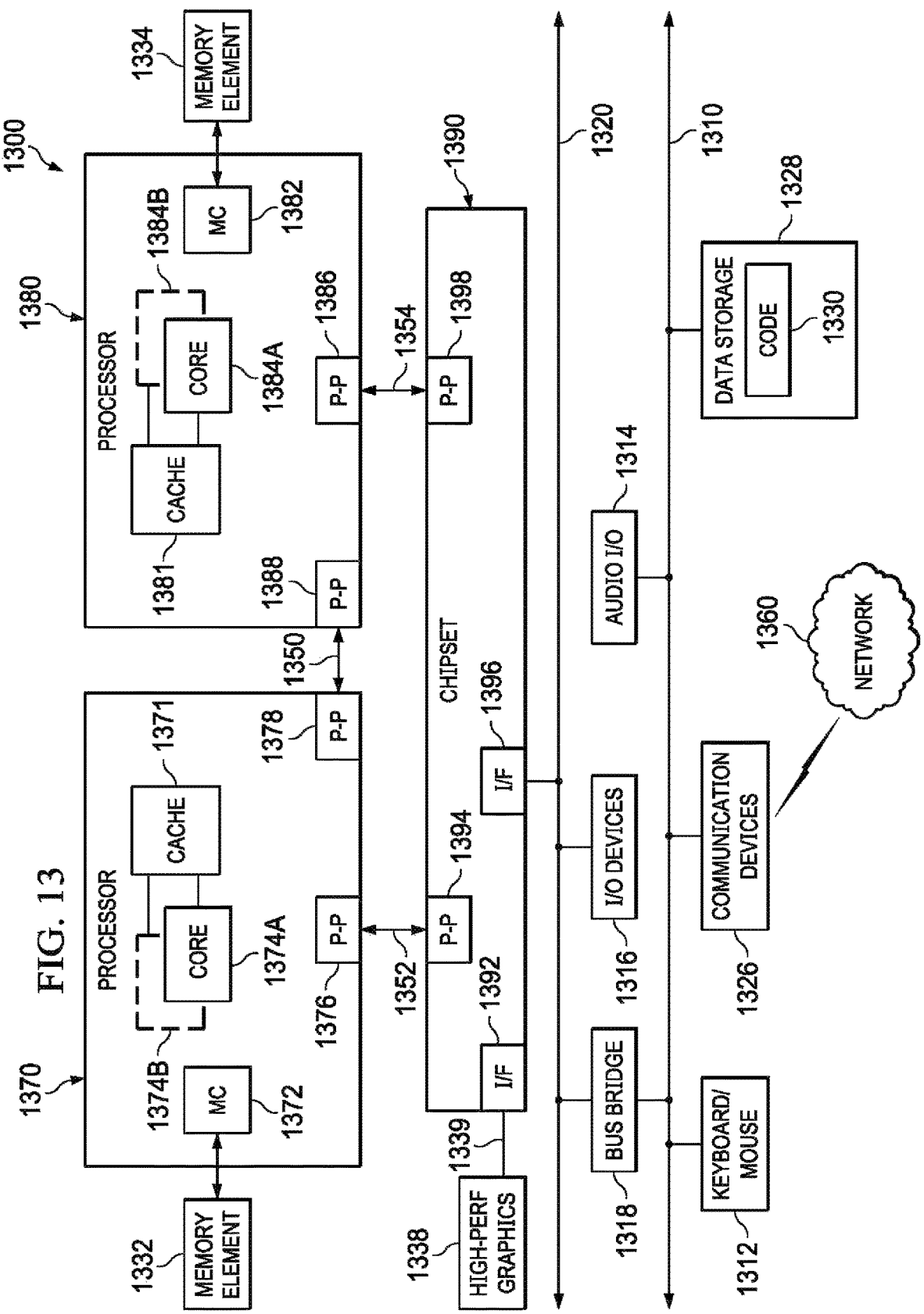
FIG. 13 is a block diagram illustrating an example computing system that is arranged in a point-to-point configuration in accordance with an embodiment.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the network elements of communication system 100 may be configured in the same or similar manner as computing system 1300.

As illustrated in FIG. 13, system 1300 may include several processors, of which only two, processors 1370 and 1380, are shown for clarity. While two processors 1370 and 1380 are shown, it is to be understood that an embodiment of system 1300 may also include only one such processor. Processors 1370 and 1380 may each include a set of cores (i.e., processor cores 1374A and 1374B and processor cores 1384A and 1384B) to execute multiple threads of a program. The cores may be configured to execute instruction code in a manner similar to that discussed above with reference to FIGS. 1-12. Each processor 1370, 1380 may include at least one shared cache 1371, 1381. Shared caches 1371, 1381 may store data (e.g., instructions) that are utilized by one or more components of processors 1370, 1380, such as processor cores 1374 and 1384.

Processors 1370 and 1380 may also each include integrated memory controller logic (MC) 1372 and 1382 to communicate with memory elements 1332 and 1334. Memory elements 1332 and/or 1334 may store various data used by processors 1370 and 1380. In alternative embodiments, memory controller logic 1372 and 1382 may be discrete logic separate from processors 1370 and 1380.

Processors 1370 and 1380 may be any type of processor and may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a high-performance graphics circuit 1338 via a high-performance graphics interface 1339, using an interface circuit 1392, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a keyboard/mouse 1312 (or other input devices such as a touch screen, trackball, etc.), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 14:
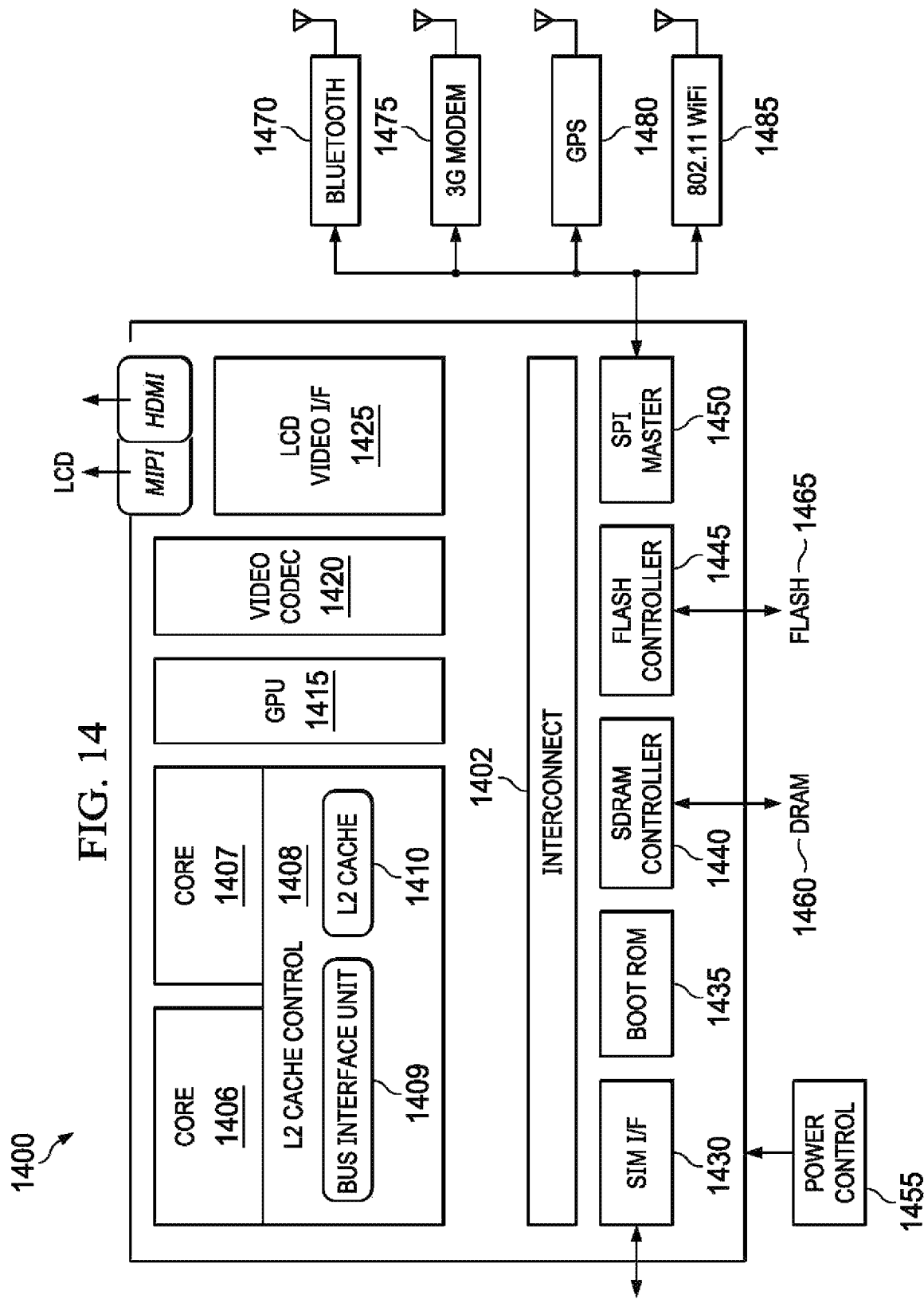
FIG. 14 is a simplified block diagram associated with an example ARM ecosystem system on chip (SOC) of the present disclosure.

Turning to FIG. 14, FIG. 14 is a simplified block diagram associated with an example ARM ecosystem SOC 1400 of the present disclosure. At least one example implementation of the present disclosure can include the reduction of touch-screen bounce features discussed herein and an ARM component. For example, the example of FIG. 14 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 14, ARM ecosystem SOC 1400 may include multiple cores 1406-1407, an L2 cache control 1408, a bus interface unit 1409, an L2 cache 1410, a graphics processing unit (GPU) 1415, an interconnect 1402, a video codec 1420, and a liquid crystal display (LCD) I/F 1425, which may be associated with mobile industry processor interface (MIPI)/high-definition multimedia interface (HDMI) links that couple to an LCD.

ARM ecosystem SOC 1400 may also include a subscriber identity module (SIM) I/F 1430, a boot read-only memory (ROM) 1435, a synchronous dynamic random access memory (SDRAM) controller 1440, a flash controller 1445, a serial peripheral interface (SPI) master 1450, a suitable power control 1455, a dynamic RAM (DRAM) 1460, and flash 1465. In addition, one or more example embodiments include one or more communication capabilities, interfaces, and features such as instances of Bluetooth™ 1470, a 3G modem 1475, a global positioning system (GPS) 1480, and an 802.11 Wi-Fi 1485.

In operation, the example of FIG. 14 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 15:
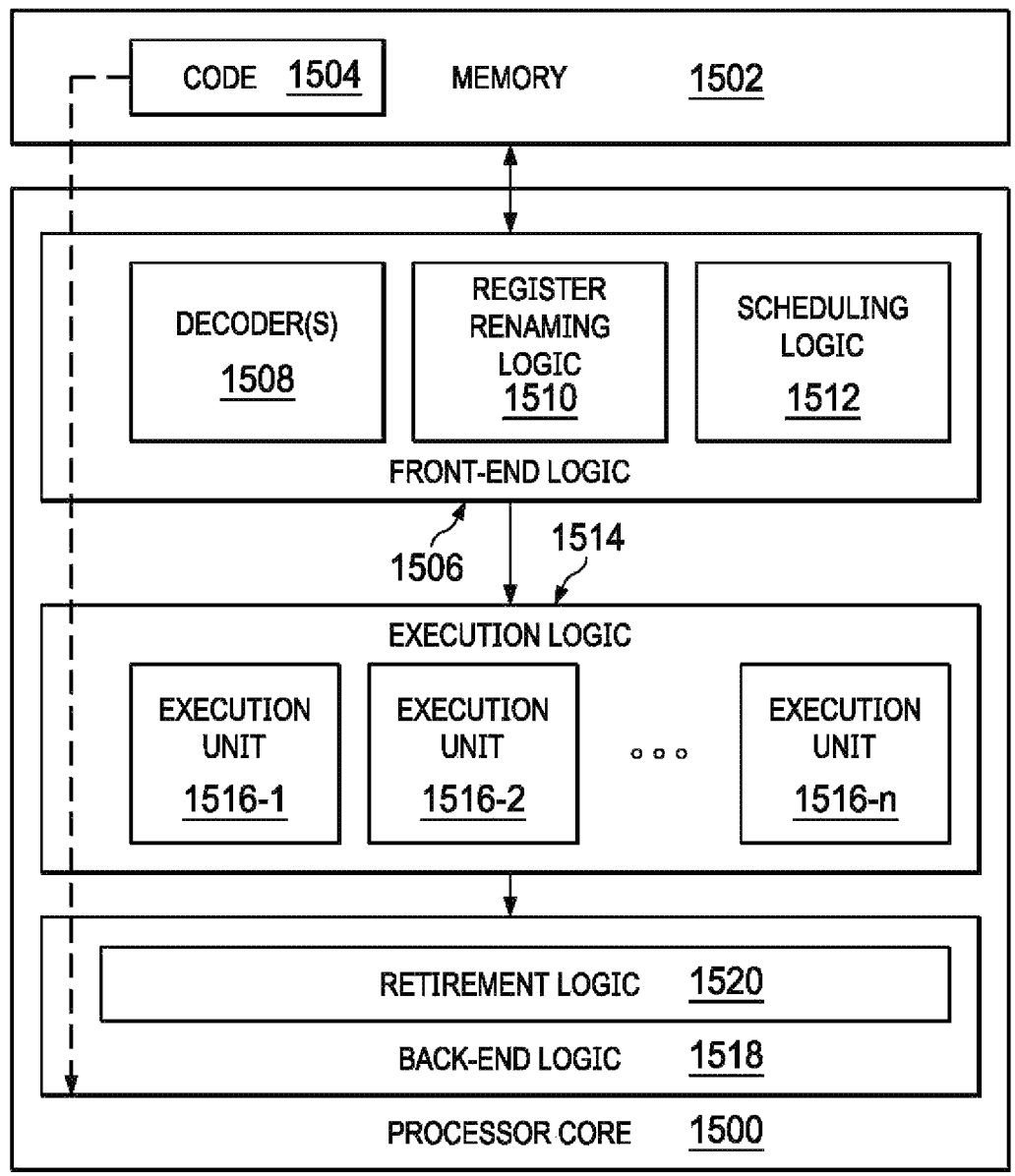
FIG. 15 is a block diagram illustrating an example processor core in accordance with an embodiment.

FIG. 15 illustrates a processor core 1500 according to an embodiment. Processor core 1500 may be the core for any type of processor, such as a micro-processor, an embedded processor, a digital signal processor (DSP), a network processor, or other device to execute code. Although only one processor core 1500 is illustrated in FIG. 15, a processor may alternatively include more than one of the processor core 1500 illustrated in FIG. 15. For example, processor core 1500 represents one example embodiment of processors cores 1374a, 1374b, 1374a, and 1374b shown and described with reference to processors 1370 and 1380 of FIG. 13. Processor core 1500 may be a single-threaded core or, for at least one embodiment, processor core 1500 may be multi-threaded in that it may include more than one hardware thread context (or "logical processor") per core.

FIG. 15 also illustrates a memory 1502 coupled to processor core 1500 in accordance with an embodiment. Memory 1502 may be any of a wide variety of memories (including various layers of memory hierarchy) as are known or otherwise available to those of skill in the art. Memory 1502 may include code 1504, which may be one or more instructions, to be executed by processor core 1500. Processor core 1500 can follow a program sequence of instructions indicated by code 1504. Each instruction enters a front-end logic 1506 and is processed by one or more decoders 1508. The decoder may generate, as its output, a micro operation such as a fixed width micro operation in a predefined format, or may generate other instructions, microinstructions, or control signals that reflect the original code instruction. Front-end logic 1506 also includes register renaming logic 1510 and scheduling logic 1512, which generally allocate resources and queue the operation corresponding to the instruction for execution.

Processor core 1500 can also include execution logic 1514 having a set of execution units 1516-1 through 1516-N. Some embodiments may include a number of execution units dedicated to specific functions or sets of functions. Other embodiments may include only one execution unit or one execution unit that can perform a particular function. Execution logic 1514 performs the operations specified by code instructions.

After completion of execution of the operations specified by the code instructions, back-end logic 1518 can retire the instructions of code 1504. In one embodiment, processor core 1500 allows out of order execution but requires in order retirement of instructions. Retirement logic 1520 may take a variety of known forms (e.g., re-order buffers or the like). In this manner, processor core 1500 is transformed during execution of code 1504, at least in terms of the output generated by the decoder, hardware registers and tables utilized by register renaming logic 1510, and any registers (not shown) modified by execution logic 1514.

Although not illustrated in FIG. 15, a processor may include other elements on a chip with processor core 1500, at least some of which were shown and described herein with reference to FIG. 13. For example, as shown in FIG. 13, a processor may include memory control logic along with processor core 1500. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 8-12) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is an electronic device that includes a display and a bounce reduction mechanism configured to provide an active counterforce to a force on the display.

In Example A2, the subject matter of Example A1 may optionally include a proximity sensor, wherein the proximity sensor can detect when a device is going to create the force on the display.

In Example A3, the subject matter of any of the preceding 'A' Examples can optionally include where the active counterforce is provided if the force is greater than a threshold force.

In Example A4, the subject matter of any of the preceding 'A' Examples can optionally include a screen bounce detection engine to detect oscillations of the display.

In Example A5, the subject matter of any of the preceding 'A' Examples can optionally include where the bounce reduction mechanism is configured to provide an active counterforce to dampen oscillation of the display.

In Example A6, the subject matter of any of the preceding 'A' Examples can optionally include where the bounce reduction mechanism is configured as a hinge.

In Example A7, the subject matter of any of the preceding 'A' Examples can optionally include where the bounce reduction mechanism is a oscillating piezoceramic actuator.

Example M1 is a method that includes detecting a force on a display and providing an active counter force to counter the force on the display.

In Example M2, the subject matter of any of the preceding 'M' Examples can optionally include detecting when a device is going to create the force on the display.

In Example M3, the subject matter of any of the preceding 'M' Examples can optionally include where the active counterforce is provided if the force is greater than a threshold force.

In Example M4, the subject matter of any of the preceding 'M' Examples can optionally include detecting oscillations of the display.

In Example M5, the subject matter of any of the preceding 'M' Examples can optionally include where the bounce reduction mechanism is configured to provide an active counterforce to dampen oscillation of the display.

In Example M6, the subject matter of any of the preceding 'M' Examples can optionally include where the bounce reduction mechanism is configured as a hinge.

In Example M7, the subject matter of any of the preceding 'M' Examples can optionally include where the bounce reduction mechanism is an oscillating piezoceramic actuator.

Example AA1 can include an electronic device that includes a touchscreen display, a bounce reduction engine configured to calculate a counterforce to a force on the touchscreen display, and a bounce reduction mechanism configured to provide the active counterforce to the force on the touchscreen display.

In Example AA2, the subject matter of any of the preceding 'AA' Examples can optionally include a proximity sensor, wherein the proximity sensor can detect when a device is going to create the force on the display.

In Example AA3, the subject matter of any of the preceding 'AA' Examples can optionally include where the active counterforce is provided if the force is greater than a threshold force.

In Example AA4, the subject matter of any of the preceding 'AA' Examples can optionally include a screen bounce detection engine to detect oscillations of the display.

In Example AA4, the subject matter of any of the preceding 'AA' Examples can optionally include where the bounce reduction mechanism is configured to provide an active counterforce to dampen oscillation of the display.

In Example AA4, the subject matter of any of the preceding 'AA' Examples can optionally include where the the bounce reduction mechanism is configured as a hinge.

An example system S1 can include means for detecting a force on a display and means for providing an active counter force to counter the force on the display.

In Example S2, the subject matter of any of the preceding 'S' Examples can optionally include means for detecting when a device is going to create the force on the display.

In Example S3, the subject matter of any of the preceding 'S' Examples can optionally means for detecting oscillations of the display.

In Example S4, the subject matter of any of the preceding 'S' Examples can optionally include where the bounce reduction mechanism is configured to provide an active counterforce to dampen oscillation of the display.

In Example S5, the subject matter of any of the preceding 'S' Examples can optionally include where the bounce reduction mechanism is configured as a hinge.

Example X1 is a machine-readable storage medium including machine-readable instructions to implement a method or realize an apparatus as in any one of the Examples A1-A7, M1-M7, and AA1-AA4. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
   a display, wherein the display includes a plurality of display regions;
   a proximity sensor, wherein the proximity sensor can detect motion of an input device that is going to create a force on the display and one or more of the plurality of display regions where the input device will create the force on the display;
   a plurality of screen bounce detection engines, wherein each of the plurality of display regions includes a screen bounce detection engine, wherein at least one screen bounce detection engine can determine a velocity of the input device; and
   a bounce reduction mechanism, wherein when the determined velocity of the input device is greater than a threshold, the bounce reduction mechanism is configured to provide one or more active counter forces in response to the force on the display at an approximate time the input device contacts the display.

2. The electronic device of claim 1, wherein the bounce reduction mechanism is configured to provide an active counter force to dampen oscillation of the display.

3. The electronic device of claim 1, the bounce reduction mechanism is configured as a hinge.

4. The electronic device of claim 1, wherein the bounce reduction mechanism is an oscillating piezoceramic actuator.

5. A method, comprising:
   detecting, by a proximity sensor, motion of an input device that will create a force on a display that includes a plurality of display regions, wherein each of the plurality of display regions includes a screen bounce detection engine;
   detecting, using the proximity sensor, one or more of the plurality of display regions where the input device will create the force on the display;
   determining a velocity of the input device; and
   providing, by a bounce reduction mechanism when the determined velocity of the input device is greater than a threshold, one or more active counter forces to counter the force on the display at an approximate time the input device contacts the display.

6. The method of claim 5, wherein the bounce reduction mechanism is configured to provide an active counter force to dampen oscillation of the display.

7. The method of claim 6, wherein the bounce reduction mechanism is configured as a hinge.

8. The method of claim 6, wherein the bounce reduction mechanism is an oscillating piezoceramic actuator.

9. An electronic device, comprising:
   a touchscreen display, wherein the touchscreen display includes a plurality of display regions;
   a proximity sensor, wherein the proximity sensor can detect when motion of an input device that is going to create a force on the touchscreen display and one or more of the plurality of display regions where the input device will create the force on the touchscreen display;

a plurality of screen bounce detection engines, wherein each of the plurality of display regions includes a screen bounce detection engine, wherein at least one screen bounce detection engine can determine a velocity of the input device;

a bounce reduction engine configured to calculate a counter force to the force on the touchscreen display when the determined velocity of the input device is greater than a threshold; and a bounce reduction mechanism configured to provide the counter force to the force on the touchscreen display at an approximate time the input device contacts the touchscreen display.

10. The electronic device of claim 9, wherein the bounce reduction mechanism is configured to provide an active counter force to dampen oscillation of the touchscreen display.

11. The electronic device of claim 9, wherein the bounce reduction mechanism is configured as a hinge.

12. A system, comprising:

a proximity sensor for detecting motion of an input device that will create a force on a display that includes a plurality of display regions and for detecting one or more of the plurality of display regions where the input device will create the force on the display;

at least one screen bounce detection mechanism for determining a velocity of the input device, wherein each of the plurality of display regions includes a screen bounce detection engine;

and a bounce reduction mechanism for providing one or more active counter forces when the determined velocity of the input device is greater than a threshold to counter the force on the display at an approximate time the input device contacts the display.

13. The system of claim 12, wherein the bounce reduction mechanism is configured to provide the active counter forces to dampen oscillations of the display.

14. The system of claim 12, wherein the bounce reduction mechanism for providing the active counter forces is configured as a hinge.

* * * * *

UNITED STATES PATENT AND TRADEMARK OFFICE
CERTIFICATE OF CORRECTION

PATENT NO. : 10,698,518 B2  
APPLICATION NO. : 15/778755  
DATED : June 30, 2020  
INVENTOR(S) : Kenan Huseyin Arik et al.

Page 1 of 1

It is certified that error appears in the above-identified patent and that said Letters Patent is hereby corrected as shown below:

In Column 1, Line 1, Below Title, insert -- CROSS-REFERENCE TO RELATED APPLICATION This application is a national stage application under 35 U.S.C. § 371 of PCT International Application Serial No. PCT/US2015/067232, filed on December 22, 2015 and entitled "REDUCTION OF TOUCHSCREEN BOUNCE," which is hereby incorporated by reference in its entirety. --.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*